United States Patent [19]

Craw et al.

[11] 4,441,639

[45] Apr. 10, 1984

[54] QUICK-RELEASE AND QUICK-DEPLOY CONTAINER FOR EMERGENCY EQUIPMENT

[76] Inventors: Craig A. Craw; Carol S. Craw, both of 911 Kaluanui Rd., Honolulu, Hi. 96825

[21] Appl. No.: 412,299

[22] Filed: Aug. 27, 1982

[51] Int. Cl.³ .......................... A45F 3/04; B64D 17/52
[52] U.S. Cl. .................................... 224/237; 244/149; 150/52 R
[58] Field of Search ................ 224/237, 259; 244/147, 244/148, 149, 142; 150/52 R

[56] References Cited

U.S. PATENT DOCUMENTS 3,963,199  6/1976  Pravaz .................................. 244/148
4,034,940  7/1977  Bird ..................................... 244/149

Primary Examiner—Steven M. Pollard
Assistant Examiner—David Voorhees

[57] ABSTRACT

This invention refers to those containers for emergency equipment such as life rafts, etc. which normally must be firmly restrained under rough exposure and wear conditions but must have a foolproof quick-release and quick-deploy feature. It has a new and unique configuration of multi-layers of prior-art fasteners which will assure this functional operation in a direct foolproof manner, unlike prior art.

3 Claims, 6 Drawing Figures

QUICK-RELEASE AND QUICK-DEPLOY CONTAINER FOR EMERGENCY EQUIPMENT

FIELD OF INVENTION

This invention is in the field of containers for emergency equipment and materials such as liferafts, parachute gear and firefighting police equipment which require quick release and quick deployment of its contents under normally rough and inconvenient conditions.

BACKGROUND OF THE INVENTION

Prior art in this field includes many forms of containers with fasteners and connectors such as Zipper slide-fasteners, snap buttons, hooks-and-burrs, strappings with snap locks, plastic and other wrappings with shearing lanyards, buttons and holes and other systems.

Slide fasteners are not foolproof and are problems when the internal pressure of the contents presses against the opening. Cloth and other strappings do get entangled even if the snaplocks work properly. Shearing lanyards are not foolproof. Snapbuttons require that each button be handled without missing and are tedious and slow.

Containers with Velcro hook-and-burrs system are fine but are not foolproof in its normal single system to restrain the contents. Without improvements, it is subject to unintentional pulloff and the exposure of its contents if the top should unintentionally catch a passing hook.

The object of this invention is to devise a container which will firmly retain its emergency equipment and yet will release same in a simple, foolproof quick-release and quick-deploy manner.

Another objective is to provide access to the contents for periodic safety and other inspection without damaging the seal system at all.

Still another objective is to retain the simplicity of present emergency equipment by using stock materials to achieve the improvements.

SUMMARY OF THE INVENTION

This invention is a new, unique and unobvious improved container for the quick release and quick deployment of emergency equipment contents with its new and unique configuration of multiple layers of narrow Velcro hook-and-burrs fastening strips and multiple layers of flap covers for the container itself, so arranged as to effect the objectives above.

The harness shoulder straps with its standard snap-buckle arrangement and also the strap handle for hand-carrying the container around both are of prior art and no claims are made for these items.

Containers of the present art use a single layer of Velcro hook-and-burrs fastening strip to restrain the emergency contents, but the top strip of Velcro, especially the corners, are subject to unintentional catching thus causing accidental pulloffs and exposures of the contents. The obvious solution is to increase the area of the Velcro strips but this is counterproductive for it will then make it more difficult to quick release and to quick deploy the contents, requiring much more than a single quick yank of the lanyard piece. In a crisis situation as with parachute contents, it may cause panic and defeat the function of the chute.

This invention is a foolproof improvement consisting of additional layer of Velcro fasteners, all narrow and short for minimal but adequate restraint of the contents of the uninflated emergency contents but which burst release when the contents are self-inflated as in the case of life rafts, or yanked by a pilot chute. The specifications and drawings will describe how the top Velcro strip layer provides a minimal restraint to a quick yank when release is required, and how same strip is connected to the lanyard 'yank' ring which in turn will activate the compressed air bottle as in the case of the life rafts.

LEGEND OF THE NUMERALS USED ON THE DRAWINGS

1: Container Body
2: End Flap
3: Top Flap
4: End Flap
5: Bottom Flap
6: Top Side of Container
7: End Side
8: Bottom Side
9: End Side
10: Harness Strap
11: Snap Buckle
12: Rear Side of Container
13: Tote Handle Strap
14: I.D. Tag Pocket
15: Front Opening
16: Yank Strip (with Velcro)
17: Velcro Slot-Strip
18: Lanyard Ring Connector
19: Lanyard String
20: End Flap Velcro Strip
21: Top Flap Velcro Strip
22: End Flap Velcro Strip
23: Bottom Flap Velcro Strip
24: Emergency Contents

PREFERRED EMBODIMENTS OF THE INVENTION

The preferred embodiments of the inventions are shown on the drawings and the specificaitions herein. Although the emergency contents is referred hereinafter as life rafts, this invention is not limited to same but any other possible emergency ewuipment which require quick release and quick deployment.

Figure 1:
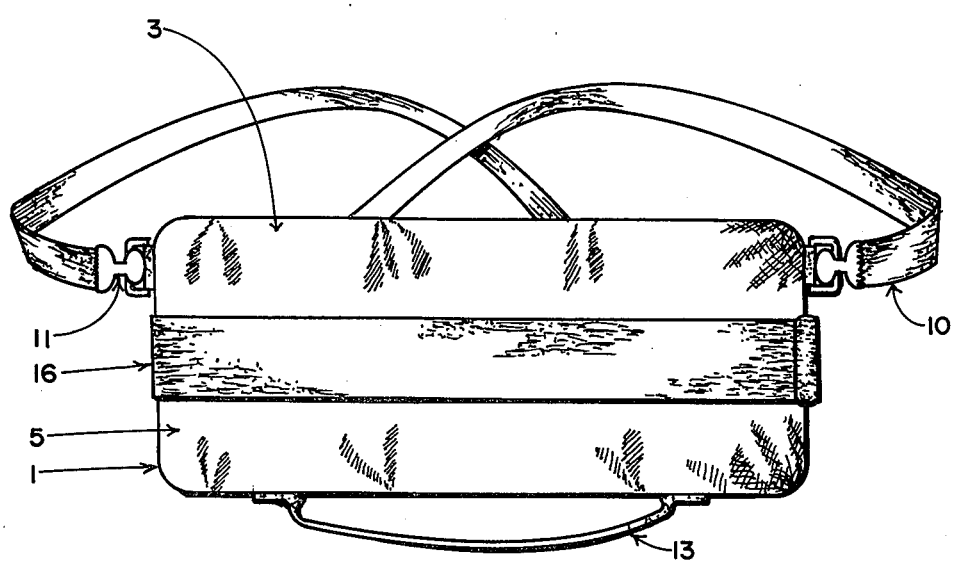
FIG. 1 is the front view of the container invention.

FIG. 1 is the front view of the container showing the the top flap 3 and bottom flap 5 covered by the Yank Strip 16, with the harness traps 10 protruding from the rear and are loosely crossed till its ends are looped into the buckles 11 which are sewn to the side panels 7 and 9.

Figure 2:
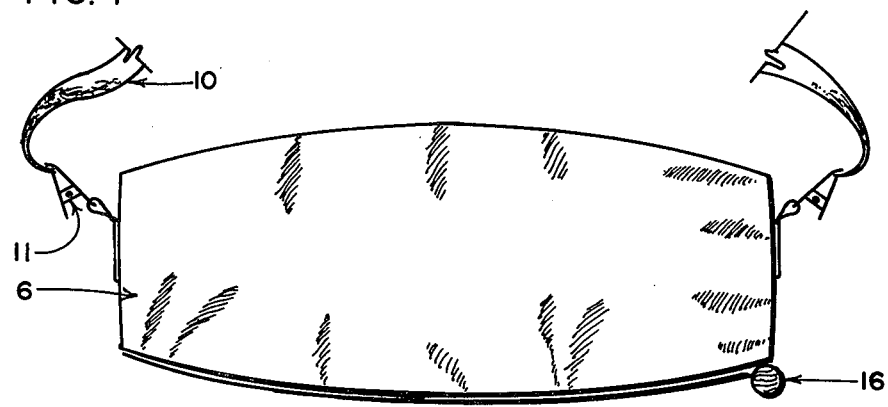
FIG. 2 is the top view of the container.
Figure 3:
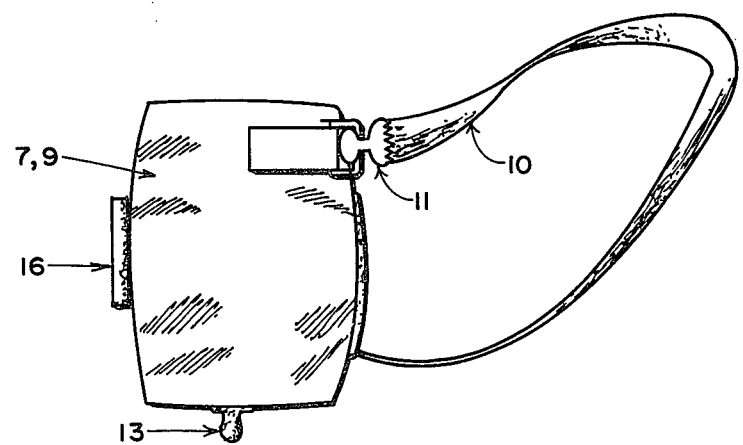
FIG. 3 is the typical end view of the container.
Figure 4:
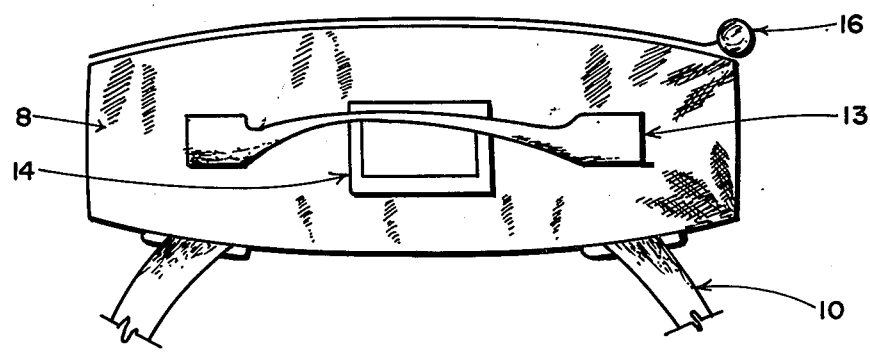
FIG. 4 is the bottom view of the container.

FIG. 2 is the top view of the container body 1 and shows the top side panel 6 with the shoulder harness straps 10 at the rear. FIG. 3 is the typical end panel 7 and 9 view with the harness 10 and buckle 11 shown as well as the tote handle strap 13 from the bottom. FIG. 4 is the bottom view showing the tote handle strap 13 and the I.D. Tag pocket 14 sewn onto the bottom panel 8.

Figure 6:
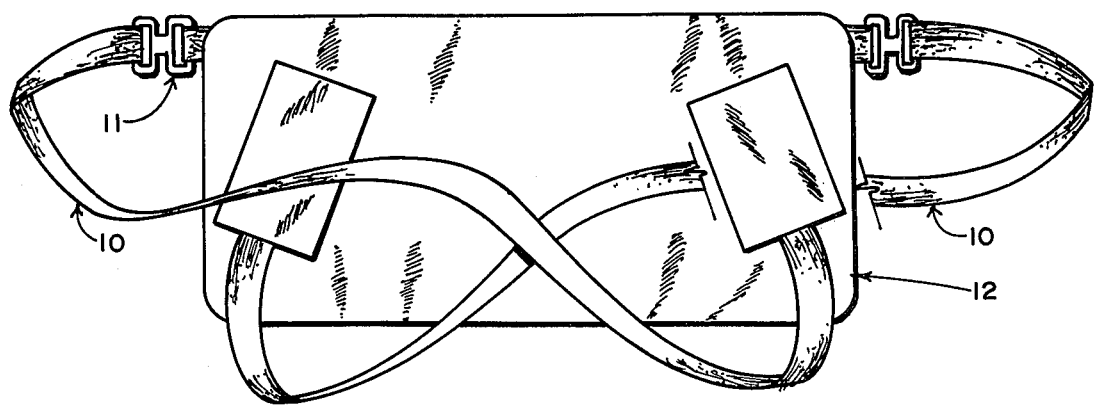
FIG. 6 is the rear view of the container showing strap arrangement.

FIG. 6 is the rear view of the container 1 showing the harness strap 10 arrangement tied to the buckle 11 as sewn on Rear Panel 12 of the container body.

Figure 5:
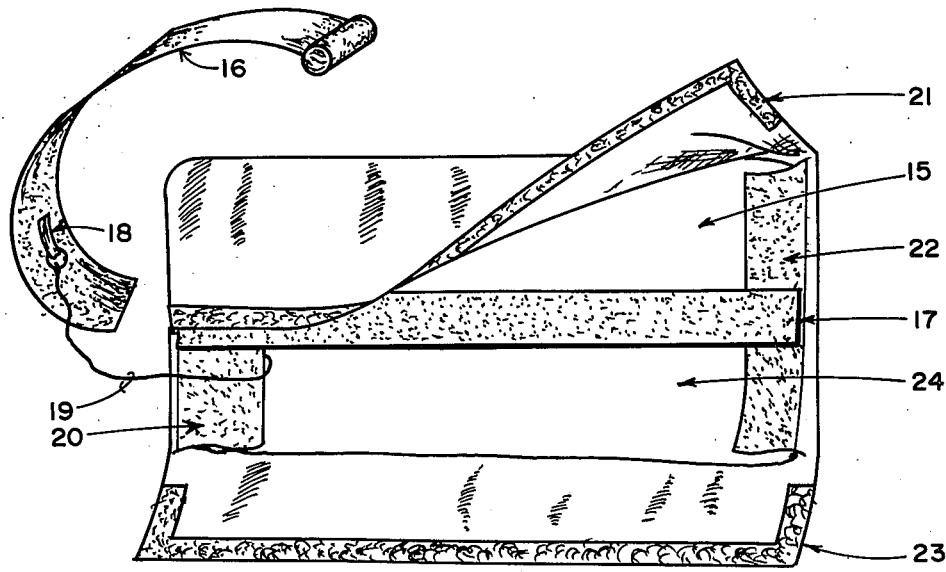
FIG. 5 is the front view of the container with the Yank Strip pulled off, revealing the underlying Slot Strip Velcro.

FIG. 5 is the front view of the assembled container with the Yank Strip 16 partially pulled off to reveal the Lanyard Ring Connector 18 with the Lanyard String 19 connected and leading into the trigger release of the compressed air bottle that will burst the contents 24 through the front opening 15 of the container.

This FIG. 5 also shows how the edges of the flaps 2, 3, 4, and 5 are narrow-hemmed top and bottom with Velcro fastener strips 20, 21, 22, and 23 so that they will adhere to both the top Yank Strip 16 and the underlying Slot Strip 17 which is covered with Velcro only on the top or exposed side only, no Velcro on the inside facing the contents. Slot Strip 17 is a loose and separate short closing piece with the minimal of restraint of the contents because of its narrowness. However, when the configuration of three layers of Velcro strip fasteners are adhering to each and all the others, a new and unique bond is created comprising of the flap Velcro strips 20, 21, 22, and 23 held firmly and very strongly between the top Yank Strip 16 and the underlying Slot-Strip 17, an unobvious situation. As long as the Yank Strip 15 is in this system, the contents cannot break the seal and bond. When the Yank Strip 16 is removed as in an emergency, the lanyard 19 will trigger the compressed air bottle which will inflate the contents 24 in this case a life raft, which will easily burst the light seal of the flaps on the underlying Slot-Strip 17 since the latter is narrow and has only the minimal of restraint areas on the flaps 20, 21, 22 and 23.

This invention makes possible a very compact container for life support equipment and yet provides foolproof quick-release and quick-deployment of its contents. Other forms of harnessing, toting handles, and thigh strappings are possible with this container's configuration and unique release opening. Claims are not limited to the contents mentioned but to all applicable situations for emergency usages.

We claim:

1. A container for emergency equipment such as an inflatable life raft comprising a single unitary piece of flexible sheet material formed with a back panel, a top flap, a bottom flap and a pair of side flaps, a separate and loose inner strip, an outer strip and a lanyard, said flaps being of a size and configuration such that when all four said flaps are folded over said back panel, said flaps' edges do not meet but form a rectangular slot outlined by said flaps' edges, said flap edges and said inner strip being covered on both exterior and interior facing sides with mating hook and burr Velcro-like material and said outer strip having mating hook and Burr Velcro-like material on the interior facing side, wherein said flaps and strips may be engaged in a mating relationship to form a closure for said container such that when said side flaps are positioned interiorly of said inner strip, said top and bottom flaps and said outer strip, and said inner strip is positioned exteriorly of said side flaps and interiorly of said top and bottom flaps and said outer strip, said top and bottom flaps are folded over said back panel and are engaged in a mating relationship to said side panels and said inner strip by hook and burr Velcro-like material, and said outer strip is engaged in a mating relationship to the exterior of said top, bottom and side flaps and said inner strip to provide a multiple layer seal of hook and burr Velcro-like material to restrain said contents, but to only lightly retain the contents when the outer strip is removed, said lanyard is connected on the inside of one end of said outer strip and the other end of said lanyard may be attached to a bottle of compressed air for inflating a life raft such that when the outer strip is ripped off, the lanyard is pulled and air is released into the life raft which will burst said container thus effecting quick deployment of the emergency equipment.

2. A container as claimed in claim 1 further comprising a shoulder harness attached to the container by snaplocks or equivalent adjustable fasteners.

3. A container as claimed in claim 1 further comprising a toting handle, an identification tag and pockets on the exterior of the container.

* * * * *